(12) United States Patent
Fisher et al.

(10) Patent No.: US 10,344,939 B2
(45) Date of Patent: Jul. 9, 2019

(54) VEHICLE LIGHTING ASSEMBLY

(71) Applicants: Honda Motor Co., Ltd., Tokyo (JP); Stanley Electric Co., Ltd., Tokyo (JP)

(72) Inventors: Nathan M. Fisher, Raymond, OH (US); Peter W. Fehrenbach, Columbus, OH (US); Matthew T. Krites, Columbus, OH (US)

(73) Assignees: Honda Motor Co., Ltd., Tokyo (JP); STANLEY ELECTRIC CO., LTD., Tokyo (JP)

( * ) Notice: Subject to any disclaimer, the term of this patent is extended or adjusted under 35 U.S.C. 154(b) by 157 days.

(21) Appl. No.: 15/441,664

(22) Filed: Feb. 24, 2017

(65) Prior Publication Data
US 2018/0195682 A1 Jul. 12, 2018

Related U.S. Application Data

(60) Provisional application No. 62/443,871, filed on Jan. 9, 2017.

(51) Int. Cl.
*F21S 43/236* (2018.01)
*B60Q 1/34* (2006.01)
(Continued)

(52) U.S. Cl.
CPC ............. *F21S 43/26* (2018.01); *B60Q 1/34* (2013.01); *F21S 43/14* (2018.01); *F21S 43/19* (2018.01);
(Continued)

(58) Field of Classification Search
CPC ...... F21S 48/1323; F21S 43/26; F21S 43/237; F21S 43/249; F21S 43/40; F21S 43/14;
(Continued)

(56) References Cited

U.S. PATENT DOCUMENTS 6,925,243 B2 8/2005 Lin
7,086,765 B2 8/2006 Wehner
(Continued)

FOREIGN PATENT DOCUMENTS

DE 102011050423 11/2012
EP 2722578 4/2014
(Continued)

OTHER PUBLICATIONS

Internet photos: Ford http://www.caranddriver.com/photo-gallery/2017-ford-fusion-updated-and-sport-ified-official-photos-and-info#17.

*Primary Examiner* — Anh T Mai
*Assistant Examiner* — Natnaniel J Lee
(74) *Attorney, Agent, or Firm* — Rankin, Hill & Clark LLP

(57) ABSTRACT

A vehicle lighting assembly includes a light housing having a first part and a separate second part. A first light assembly provided in the first part includes a first lens having a first light pipe, a separate second lens having a second light pipe, first and second light sources for illuminating the first and second lens, a first reflector adjacent the first lens, and a second reflector adjacent the second lens. A second light assembly provided in the second part includes a third lens having a third light pipe, a separate fourth lens having a fourth light pipe, a third light source for illuminating the third and fourth lens, a third reflector adjacent the third lens and defining a first channel receiving a portion of the third lens, and a fourth reflector adjacent the fourth lens and defining a second channel receiving a portion of the fourth lens.

18 Claims, 12 Drawing Sheets

(51) Int. Cl.
- *F21S 43/20* (2018.01)
- *F21S 43/40* (2018.01)
- *F21S 43/14* (2018.01)
- *F21S 43/19* (2018.01)
- *F21S 43/237* (2018.01)
- *F21S 43/239* (2018.01)
- *F21S 43/245* (2018.01)
- *F21S 43/249* (2018.01)
- *F21S 43/30* (2018.01)
- *F21W 103/20* (2018.01)

(52) U.S. Cl.
CPC ........... *F21S 43/236* (2018.01); *F21S 43/237* (2018.01); *F21S 43/239* (2018.01); *F21S 43/245* (2018.01); *F21S 43/249* (2018.01); *F21S 43/40* (2018.01); *F21S 43/30* (2018.01); *F21W 2103/20* (2018.01)

(58) Field of Classification Search
CPC ........ F21S 43/19; F21S 43/239; F21S 43/245; F21S 43/236; B60Q 1/34
See application file for complete search history.

(56) References Cited

U.S. PATENT DOCUMENTS

| | | | |
|---|---|---|---|
| 7,357,549 | B2 | 4/2008 | Gunther |
| 8,333,493 | B2 | 12/2012 | Taleb-Bendiab et al. |
| 8,454,214 | B2 | 6/2013 | Kazaoka |
| 8,632,232 | B2 | 1/2014 | Okui et al. |
| 9,242,594 | B2* | 1/2016 | Nakada .................. G02B 6/002 |
| 2011/0179719 | A1* | 7/2011 | Matsumoto ................ B60J 5/10 49/502 |
| 2011/0242831 | A1 | 10/2011 | Okui et al. |
| 2012/0250345 | A1 | 10/2012 | Peron et al. |
| 2013/0201709 | A1* | 8/2013 | Natsume .................. B60Q 1/00 362/511 |
| 2014/0160779 | A1* | 6/2014 | Pusch .................. B60Q 1/2607 362/511 |

FOREIGN PATENT DOCUMENTS

| | | |
|---|---|---|
| JP | 2006114309 | 4/2006 |
| JP | 2007250290 | 9/2007 |

* cited by examiner

VEHICLE LIGHTING ASSEMBLY

BACKGROUND

In the past, vehicle lighting systems usually consisted of a plurality of incandescent or halogen bulbs, acting as light sources, located near the front or rear of the vehicle. Usually, these light sources had a fixed function. For example, in the case of rearward lighting, certain light sources may be used to meet a stop/tail function, while other light sources would be needed to meet a turning function. As vehicle designs became increasingly complex and new and different styling options were required, such as those with a thin and elongated aspect ratio, the number of light sources required to provide complex designs generally increased. However, as the number of light sources increase, there is a greater chance that one or more of these light sources will fail and need to be replaced. This can be especially problematic when a majority of the light sources are operating properly but some are not operating properly and need to be replaced. In addition, styling options may be constrained or limited based on package area required to accommodate the multiple light sources.

With the advent of high power light emitting diodes (LEDs) coming into common usage, the light pipe offers a solution to use less light sources. For example, instead of using a single row array of low power LEDs to illuminate the area of a lamp function, one LED at one end of the light pipe may be used to illuminate the same size area. Additionally, the light pipe offers a greater variety of styling options. Light pipes are generally well known in the art and operate by transmitting light via total internal reflection. The light provided to the light pipe can be generated by as few as one light source, minimizing the need for numerous light sources, while offering a variety of styling options.

BRIEF DESCRIPTION

According to one aspect, a vehicle assembly comprises a body and a light housing mounted to the body. The light housing has a first part and a second part separate from the first part. A first light assembly is provided in the first housing part. The first light assembly includes a first lens having at least one first light pipe, a second lens separate from the first lens and having at least one second light pipe, a first light source for illuminating the first lens and a second light source for illuminating the second lens, a first reflector disposed adjacent to a rear side of the first lens, and a second reflector disposed adjacent to a rear side of the second lens. A second light assembly is provided in the second housing part. The second light assembly includes a third lens having a third light pipe, a fourth lens separate from the third lens and having a fourth light pipe, a third light source for illuminating the third lens and the fourth lens, a third reflector disposed adjacent to a rear side of the third lens and defining a first channel configured to receive a portion of the third lens, and a fourth reflector disposed adjacent to a rear side of the fourth lens and defining a second channel configured to receive a portion of the fourth lens.

According to another aspect, a vehicle assembly comprises a light housing mounted to a vehicle body. The light housing has a first housing part and a second housing part separate from and moveable relative to the first part. A first light assembly is provided in the first housing part. The first light assembly includes a first lens having a pair of first light pipes, a second lens separate from the first lens and having a pair of second light pipe, a first light source mounted on a first operating support (e.g., a first printed circuit board (PCB)) for illuminating the first lens, a second light source mounted on a second operating support (e.g., a second PCB) for illuminating the second lens, a first reflector disposed adjacent to a rear side of the first lens, and a second reflector disposed adjacent to a rear side of the second lens. A garnish extends laterally on the vehicle body. An end portion of the garnish is mounted to the first housing part. One of the first light pipes of the first lens extends along part of an upper periphery of the garnish, and one of the second light pipes of the second lens extends along part of a lower periphery of the garnish.

DETAILED DESCRIPTION

It should, of course, be understood that the description and drawings herein are merely illustrative and that various modifications and changes can be made in the structures disclosed without departing from the present disclosure. In general, the figures of the exemplary vehicle lighting assembly are not to scale. It will also be appreciated that the various identified components of the exemplary vehicle lighting assembly disclosed herein are merely terms of art that may vary from one manufacturer to another and should not be deemed to limit the present disclosure.

Figure 1:
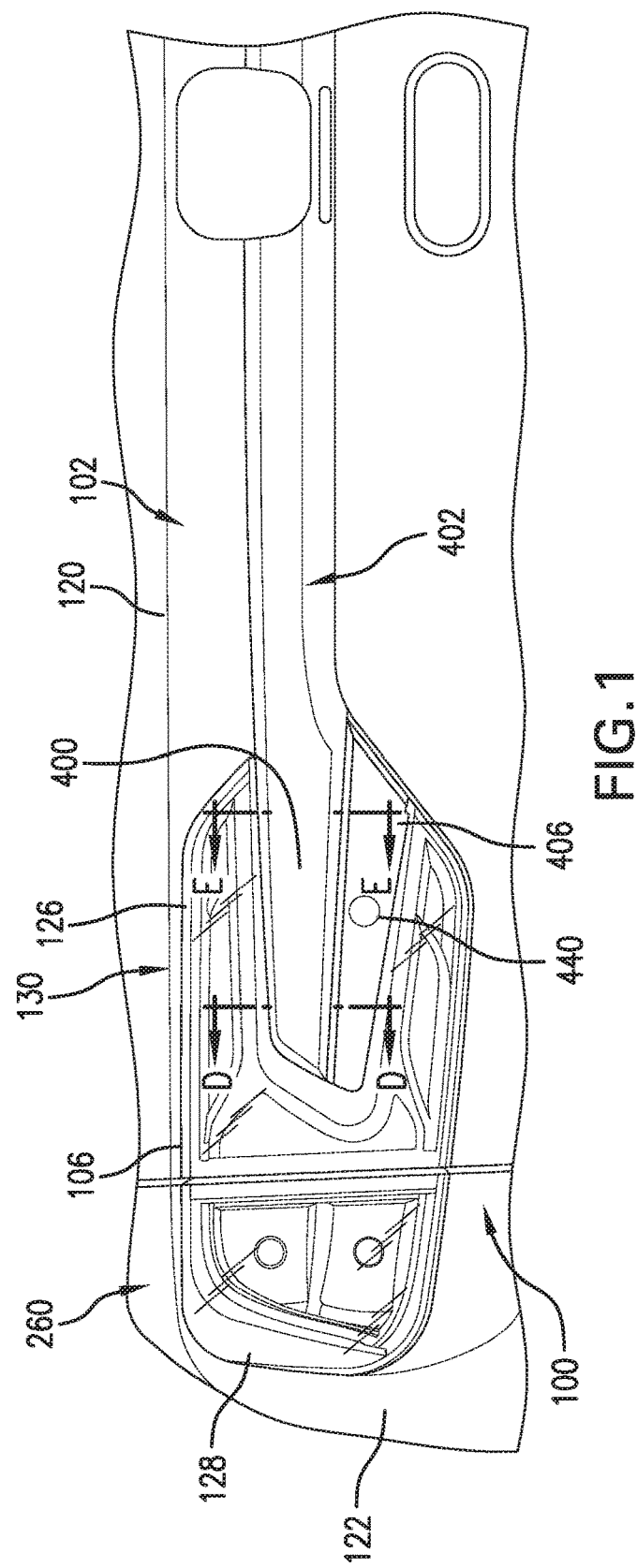
FIG. 1 is a left rear view of a vehicle body on which both an exemplary vehicle lighting assembly and a separate garnish according to the present disclosure are mounted.
Figure 2:
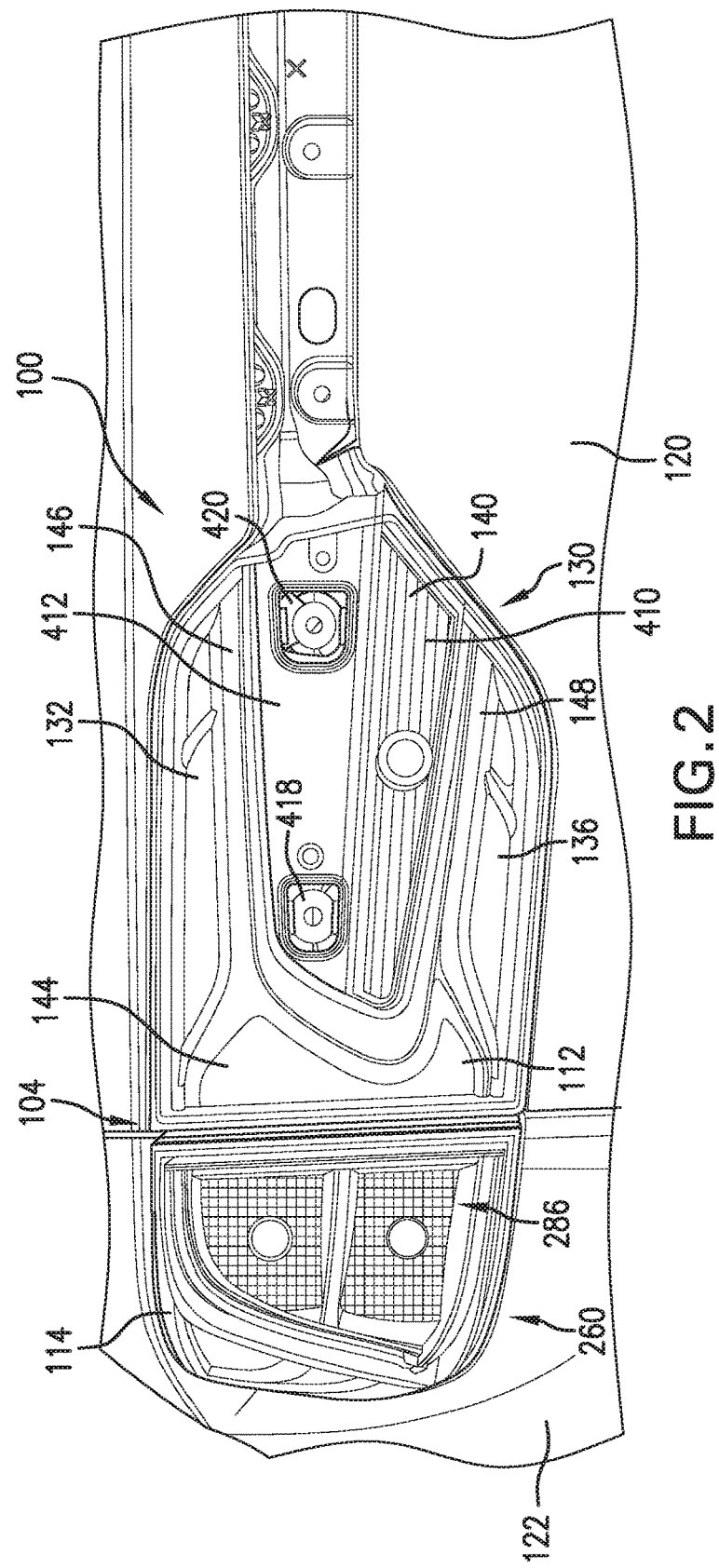
FIG. 2 is a left rear view of the vehicle body of FIG. 1 without the garnish mounted thereto and with outer lenses of the vehicle lighting assembly removed.
Figure 3:
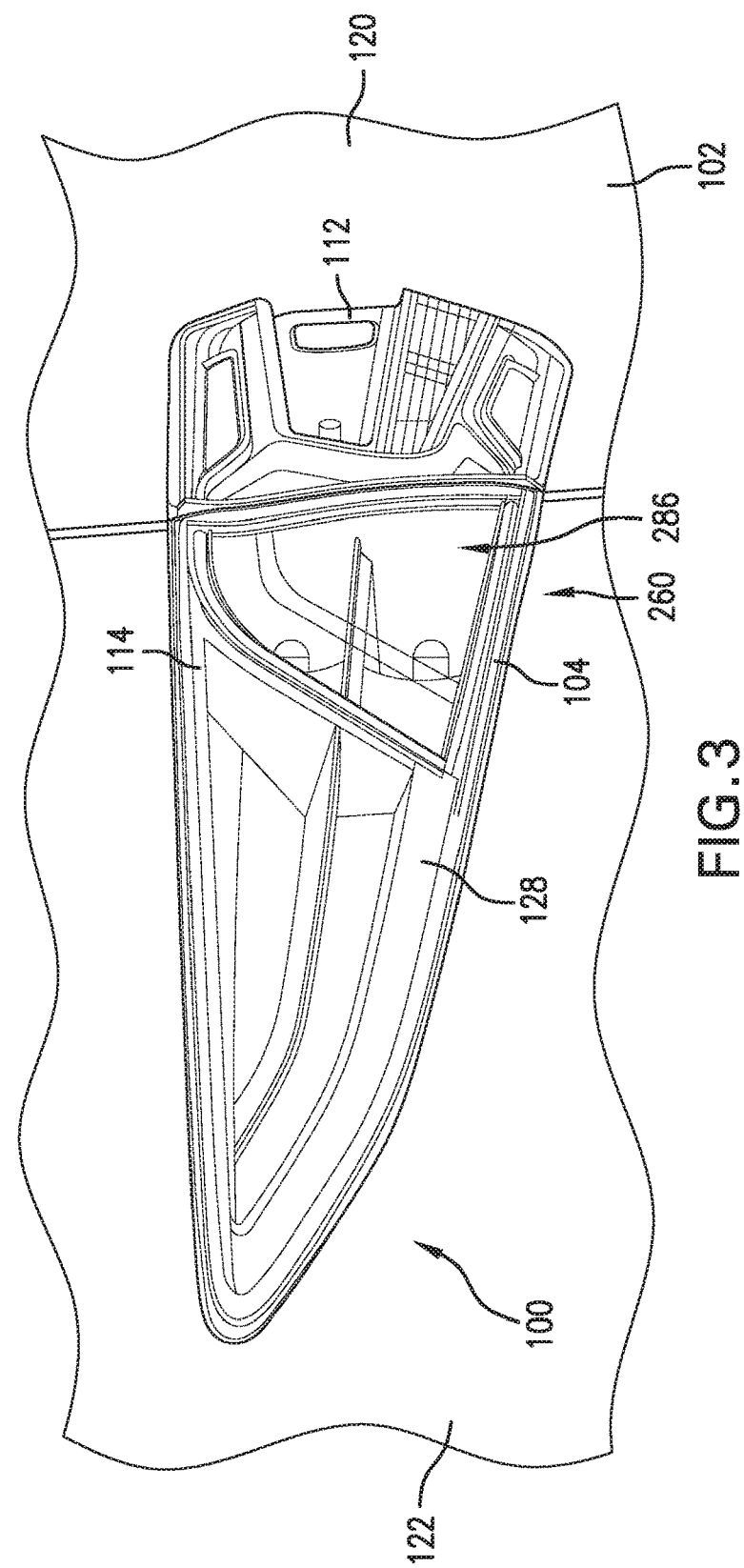
FIG. 3 is a side view of the vehicle lighting assembly of FIG. 2.

Referring now to the drawings, wherein like numerals refer to like parts throughout the several views, FIGS. 1-3 illustrate an exemplary vehicle lighting assembly 100 according to the present disclosure to be mounted to a vehicle body 102. The lighting assembly 100 includes a light housing 104 and a transparent portion or outer lens 106, that forms part of the exterior of the vehicle, mounted to the housing 104. The housing 104 is generally made of plastic, but can be made of any suitable material. Similarly, the outer lens 106 is generally made of plastic. However, it should be understood that the outer lens can be made of any suitable transparent material, including glass. Additionally, the outer lens 106 may have varying levels of transparency, such as different color pigmentation level, or different level of neutral density filter, etc. For example, portions of the outer lens 106 may be entirely transparent while other portions may be less transparent. Also, opaque portions can be added to the transparent portion so as to stylize the lighting assembly 100. In the depicted embodiment, the lighting assembly 100 is a taillight assembly, and the light housing 104 has a first housing part 112 (a lid light section) and a second housing part 114 (a tail light section) separate from the first housing part. This allows the first housing part 112 to be moveable relative to the second housing part 114, for example, the first housing part 112 can be mounted on a tailgate or trunk lid 120 and the second housing part 114 can be mounted on a rear quarter panel 122. Further, the outer lens 106 includes a first outer lens part 126 coupled to the first housing part 112 and a second outer lens part 128 coupled to the second housing part 114.

Figure 4:
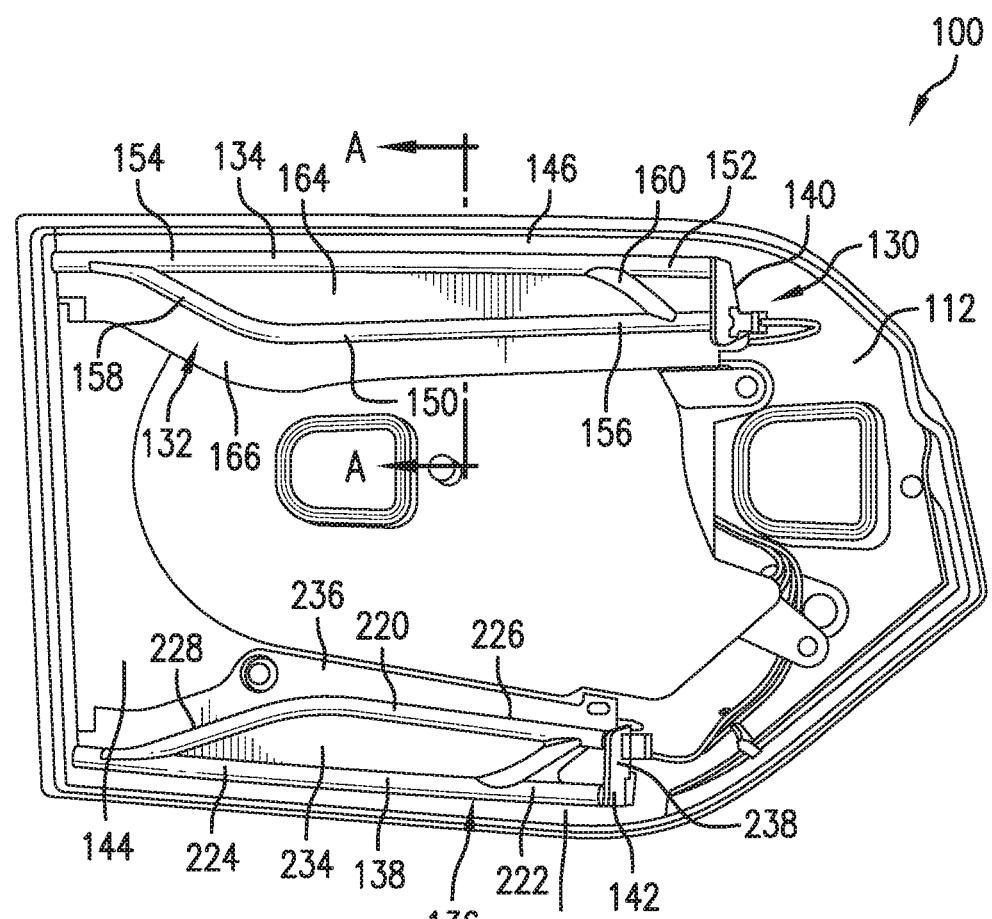
FIGS. 4 and 5 are respective front and side views of the vehicle lighting assembly without the outer lenses or reflector.

As depicted in FIG. 4, a first light assembly 130 is provided in the first housing part 112. The first light assembly 130 generally includes a first lens 132 having at least one first light pipe 134 and a second lens 136 separate from the first lens and having at least one second light pipe 138. A first light source 140 illuminates the first lens 132 and a second light source 142 illuminates the second lens 136. The first housing part 112 houses a reflector 144 for the first light assembly 130. The reflector 144 can include a first reflector 146 disposed adjacent to a rear side of the first lens 132 and a second reflector 148 disposed adjacent to a rear side of the second lens 136.

Figure 6:
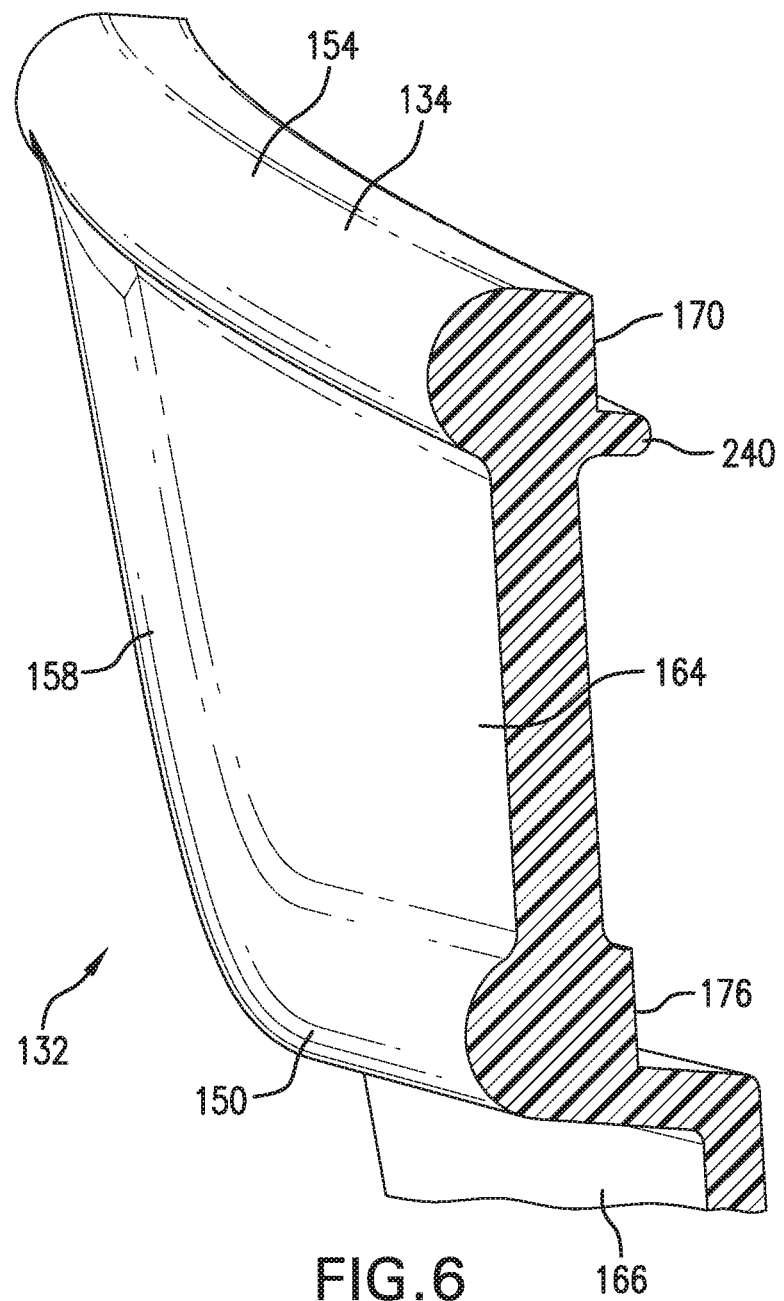
FIG. 6 is a cross-sectional view of a first lens of a lighting assembly for the vehicle lighting assembly.
Figure 7:
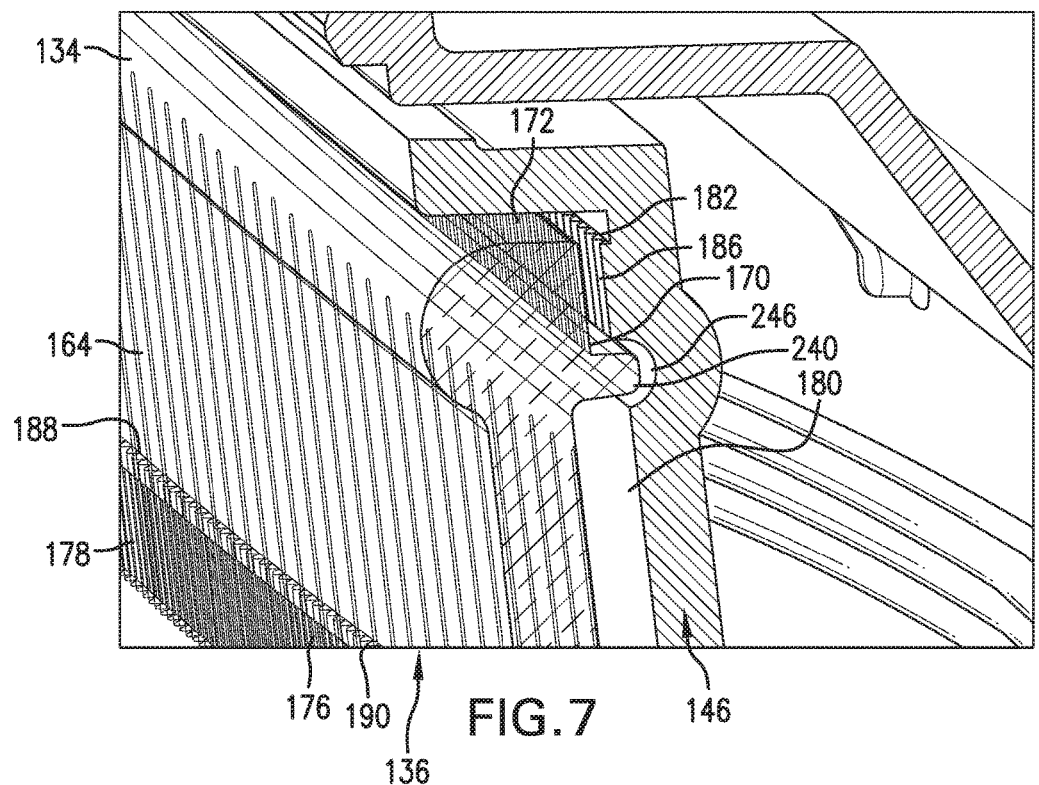
FIG. 7 is a cross-sectional view taken along line A-A of FIG. 4.

More particularly, and with additional reference to FIGS. 6 and 7, the at least one first light pipe 134 of the first lens 132 is a pair of spaced first light pipe 134, 150. The first light pipe 134 includes a first section 152 and a second section 154, and according to one aspect, the first and second sections 152, 154 are formed in a substantially straight line. The first light pipe 150 includes a first section 156 and a second section 158, and according to one aspect, the second section 158 is curved inwardly toward the second section 152 of the first light pipe 134 such that the second section 158 abuts the second section 152. It should be understood that while each of the first light pipes 134, 150 includes first and second sections, each of the first light pipes 134, 150 form one continuous and unitary light pipe. It should also be appreciated that the first light pipes 134, 150 can encompass a variety of different shapes. For example, the first and second sections of each first light pipe 134, 150 may have a plurality of curved as well as straight sections. A connecting light pipe 160 can be provided for interconnecting the first sections 152, 156; although, this is not required.

In the embodiment illustrated herein, the first light pipes 134, 150 are a constituent part of the first lens 132 which, besides the first light pipes, includes a first intermediate region 164 spanning between and connecting the first light pipes 134, 150 and a first mounting region or flange 166 located at least partially beneath the first light pipe 150 (i.e., located towards the second lens 136). The first intermediate region 164 and/or the first mounting region 166 can be made from the same material as the pair of first light pipes 134, 150 and each is of a thinner thickness than the first light pipes 134, 150. Further, the cross-section of the first light pipes 134, 150 is shown more particularly as being partially round but each can also be of another shape and can be for example rectangular or oval. The first intermediate region 164 and/or the first mounting region 166 can be at least partially opaque in order to cover other parts in the interior of the first housing part 112. The first light pipes 134, 150 together with the regions 164, 166 define a unitary first lens 132 having a thick to thin section design which allows for light passing through the first lens 132 to vary intensity.

As shown in FIG. 7, a rear face side 170 the first light pipe 134 of the first lens 132 has a plurality of prisms 172 (i.e., molded in optics) arrayed generally along its length, the prisms 172 oriented in a first orientation (e.g., along a height of the rear face side 170). Here, the plurality of prisms 172 can be saw-tooth in shape. When light is provided to the first light pipe 134 via the first light source 140, the prisms 172 interfere with the natural path of the light through the first light pipe 134, and this interference causes the light to reflect in a first direction toward the outer lens 106. Additionally, as light travels past the plurality of prisms 172, each prism functions to reflect a certain portion of the light within the first light pipe 134, in the first direction. Therefore, as the light travels further from its light source, there is generally less and less light in the first light pipe 134 with each passing prism. In order to equalize the amount of light reflected by each prism, prisms that are further away from the first light source 140 can be generally larger in shape (i.e., further away prisms can have a greater depth than the closer prisms). By so doing, light reflected by the larger prisms will be similar to the amount of light reflected by the smaller prisms, even though the smaller prisms are closer to the first light source 140. In the depicted embodiment, a rear face side 176 of the first light pipe 150 can also have a plurality of prisms 178 similar to the prisms 172; although, this is not required.

As indicated previously, the first reflector 146 provided in the first housing part 112 is located behind the first lens 132. The first reflector 146 includes a forward face side 180 directly facing a rear side of the first lens. A first section 182 of the forward face side 180 directly facing the rear face side 170 of the first light pipe 134 having the prisms 172 is provided with a plurality of reflective surfaces or facets 186 formed therein. Similarly, a second section 188 of the forward face side 180 directly facing the rear face side 176 of the first light pipe 150 having the prisms 178 is provided with a plurality of reflective surfaces or facets 190 formed therein. Similar to the prisms 172, 178, the facets 186, 190 reflect light from the first light source 140 in the first direction through the first lens 132. With the facets located immediately behind the prisms 172, 178 light reflected by the first reflector 146 can be increased and such light can be even more efficiently radiated in the first direction from the first light source 140 and though the first light pipes 134, 150.

Figure 10:
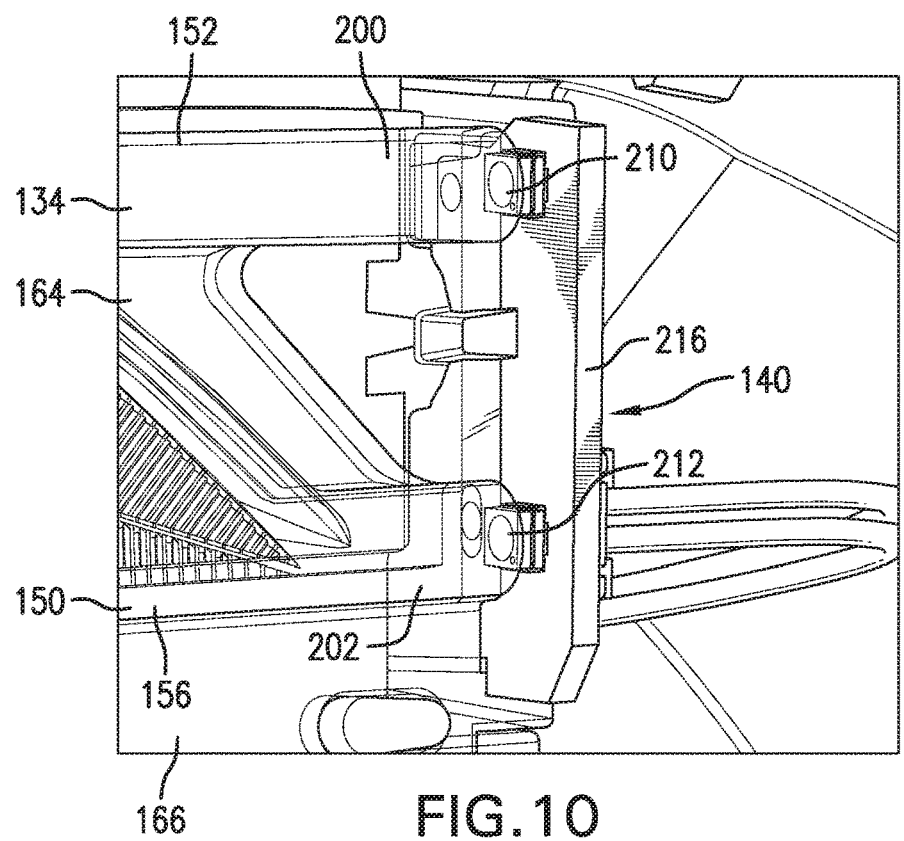
FIG. 10 is a partial perspective view of a light source for the lighting assembly.

With reference to FIGS. 4 and 10, the first section 152, 156 of each first light pipe 134, 150 includes a first end 200, 202 coupled to the first light source 140. In the depicted embodiment, the first light source is a pair of first light emitting diodes (LEDs) 210, 212 which are mounted on a common operating support 216 secured in the first housing part 112, one first LED for each first light pipe. However, the first light source 140 may be a single LED adapted to illuminate both light pipes 134, 150, an incandescent light source(s), a fluorescent light source(s), a high intensity discharge ("HID"), or any light source suitable for providing light to the first lens 132, such that it travels along each first light pipe 134, 150. The operating support 216 can be in the form of a printed circuit board (PCB). Electrical connections are provided in or on the operating support 216 and provide electrical communication from one LED to the next. The electrical connections may take a number of different forms such as simple wiring that runs along the operating support 216, or integrated connections insulated within the operating support 216.

It should be appreciated that the second lens 136 can be configured similar to the first lens 134. As depicted in FIG. 4, the at least one second light pipe 138 of the second lens 136 is a pair of spaced second light pipe 138, 220. The second light pipe 138 includes a first section 222 and a second section 224, and according to one aspect, the first and second sections 222, 224 are formed in a substantially straight line. The second light pipe 220 includes a first section 226 and a second section 228, and according to one aspect, the second section 228 is curved inwardly into engagement with the second section 222 of the second light pipe 138. Again each of the second light pipes 138, 220 forms one continuous and unitary light pipe, and the second light pipes 138, 220 can encompass a variety of different shapes. The second lens 136 further includes a second intermediate region 234 spanning between and connecting the second light pipes 138, 220 and a second mounting region or flange 236 located at least partially above the second light pipe 220 (extending toward the first mounting flange 166). The second intermediate region 234 and/or the second mounting region 236 can be made from the same material as the pair of second light pipes 138, 220 and each is of a thinner thickness than the second light pipes 138, 220. The second light pipes 138, 220 together with the regions 234, 236 define a unitary second lens 136 having a thick to thin section design which allows for light passing through the second lens 136 to vary intensity. A rear face side of each of the second light pipes 138, 220 can have a plurality of prisms similar to the prisms 172, 178. And the second reflector 148 can include a forward face side having first and second sections directly facing the rear face sides of the second light pipes 138, 220 and provided with facets similar to the facets 186, 190. The first section 222, 226 of each second light pipes 138, 220 is coupled to the second light source 142. Similar to the first light source 140, the second light source 142 can be a pair of second light emitting diodes (LEDs) which are mounted on a common operating support 238 secured in the first housing part 112.

Figure 12:
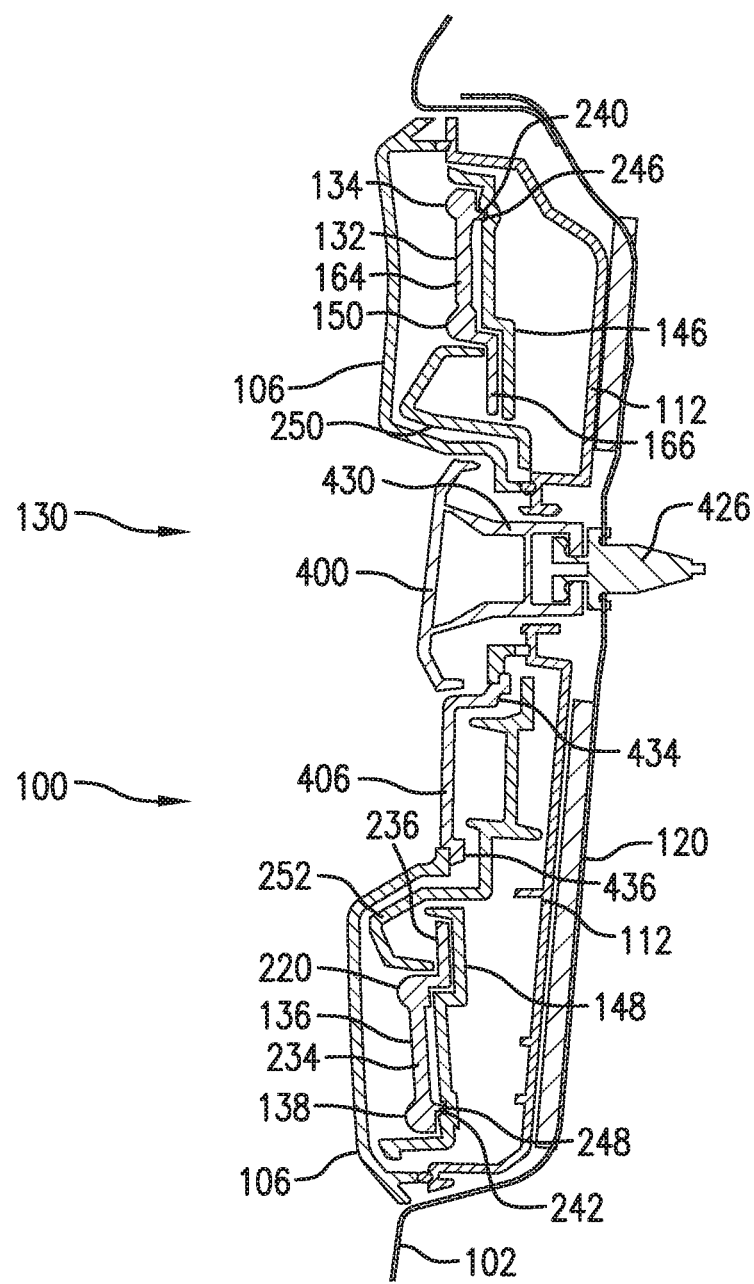
FIG. 12 is a cross-sectional view taken along line D-D of FIG. 1.

With reference to FIGS. 6, 7 and 12, to properly locate and/or secure the first and second lenses 132, 136 to the first and second reflectors 146, 148, each of the first and second lenses 132, 136 includes a locating rib 240, 242. And each of the first and second reflectors 146, 148 includes respective grooves 246, 248 adapted to receive the locating ribs 240, 242. Further, as best depicted in FIG. 12, the first lens 132 includes the first mounting region or flange 166 secured between the first reflector 146 and a first mounting member (a first inner lens) 250. Similarly, the second lens 136 includes the second mounting region or flange 236 secured between the second reflector 148 and a second mounting member (a second inner lens) 252. According to one aspect, each of the first and second mounting members 250, 252 define secondary reflectors for the first and second lenses 132, 136 of the first light assembly 130.

As depicted in FIGS. 1-3 and 5, a second light assembly 260 is provided in the second housing part 114. The second light assembly 260 includes a third lens 262 having a third light pipe 264 and a fourth lens 268 separate from the third lens 262 and having a fourth light pipe 270. The second light assembly 260 further includes a third light source 276 for illuminating the third lens 262 and the fourth lens 264. The third light pipe 264 of the third lens 262 includes a first section 280 and a second section 284, and according to one aspect, the first and second sections 152, 154 are generally curved and conform to a shape of a turn signal light assembly 286. The fourth light pipe 270 of the fourth lens 268 includes a first section 290 and a second section 292, and according to one aspect, the first and second sections are formed in a substantially straight line. It should be understood that while each of the third and fourth light pipes 264, 270 of the respective third and fourth lenses 262, 268 includes first and second sections, each of the third and fourth light pipes 264, 270 forms one continuous and unitary light pipe. It should also be appreciated that the third and fourth light pipes 264, 270 can encompass a variety of different shapes.

Figure 8:
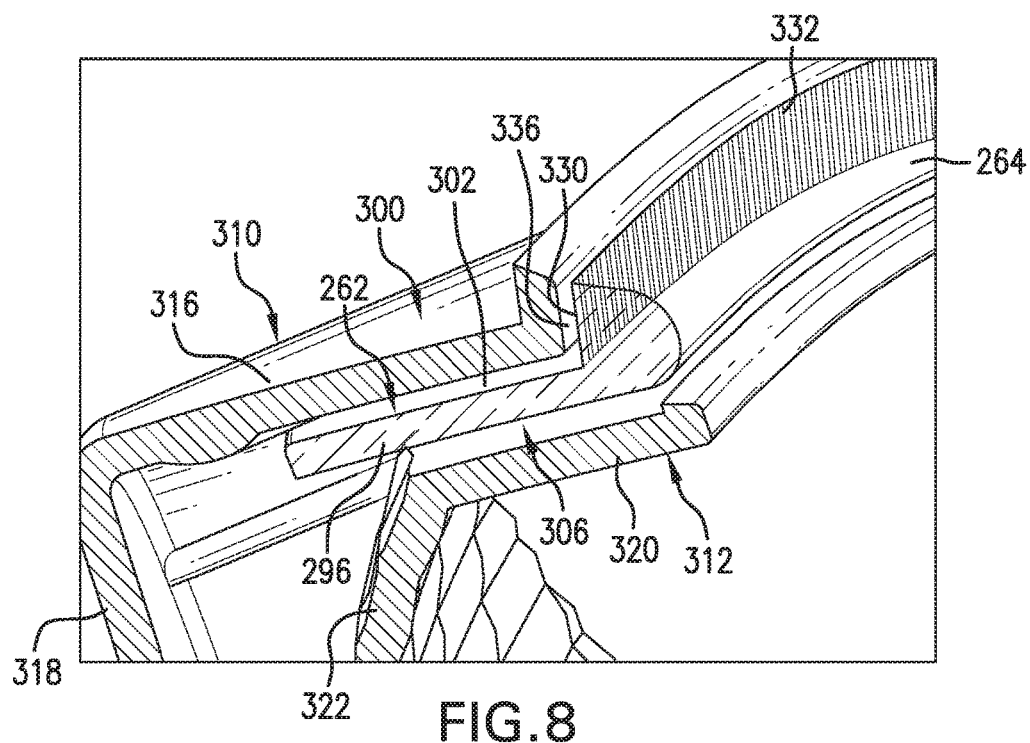
FIG. 8 is a cross-sectional view taken along line B-B of FIG. 5.
Figure 9:
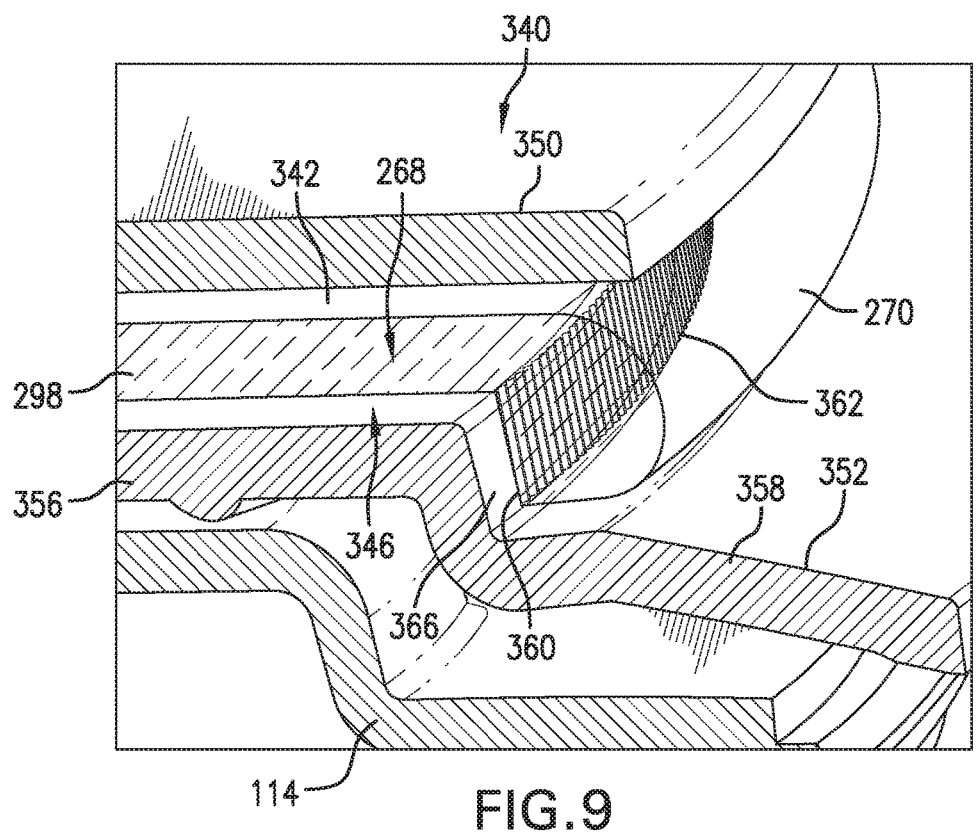
FIG. 9 is a cross-sectional view taken along line C-C of FIG. 5.

With reference to FIGS. 8 and 9, in the embodiment illustrated herein, the third light pipe 264 is a constituent part of the third lens 262 which, besides the third light pipe, includes a third mounting region or flange 296 located at least partially beneath the third light pipe 264. Similarly, the fourth light pipe 270 is a constituent part of the fourth lens 268 which, besides the fourth light pipe, includes a fourth mounting region or flange 298 located at least partially beneath the fourth light pipe 270. Each of the third and fourth mounting regions 296, 298 can be made from the same material as the respective third and fourth light pipes 264, 270. Further, the cross-section of each of the third and fourth light pipes 264, 270 is shown more particularly as being partially round but each can also be of another shape and can be for example rectangular or oval. Each of the third and fourth mounting regions 296, 298 can be at least partially opaque in order to cover other parts in the interior of the second housing part 114. The third light pipe 264 together with the third mounting region 296 define a unitary third lens 262 and the fourth light pipe 270 together with the fourth mounting region 298 define a unitary fourth lens 268.

As shown in FIG. 8, a third reflector 300 (i.e., a rear side or outer reflector) is disposed adjacent to a rear side 302 of the third lens 262 and defines a first channel 306 configured to receive a portion (i.e., the third mounting region 296) of the third lens 262. Particularly, the third reflector 300 includes a first reflector part 310 and a second reflector part 312 (i.e., a turn lamp reflector part). According to one aspect, the first part 310 includes a first section 316 which covers a portion of the second housing part 114 and a second section 318 extending from the first section 316 toward the second housing part 114. The second part 312 includes a first section 320 spaced from and extending substantially parallel to the first section 316 and a second section 322 extending from the first section 320 which can be configured as a reflector for the turn signal light assembly 286. The first sections 316, 320 of the respective first and second parts 310, 312 together define the first channel 306. Further depicted in FIG. 8 is a rear face side 330 of the third light pipe 264 provided with a plurality of prisms 332 arrayed generally along its length, the prisms 332 oriented in a first orientation (e.g., along a height of the rear face side 330). The third reflector 300 includes a forward face side 336 extending outwardly from the first section 316, the forward face side 336 facing the rear face side 330 of the third light pipe 264.

As shown in FIG. 9, a fourth reflector 340 (i.e., a front side or inner reflector) is disposed adjacent to a rear side 342 of the fourth lens 268 and defines a second channel 346 configured to receive a portion (i.e., the fourth mounting region 298) of the fourth lens 268. Particularly, and like the third reflector 300, the fourth reflector includes a first reflector part 350 and a second reflector part 352. According to one aspect, the second part 352 has a stepped configuration including a first section 356 which is spaced from and extending substantially parallel to the first part 350 and a second section 358. The first section 356 together with the first part 350 defines the second channel 346. The second section 358 can be configured as another reflector for the turn signal light assembly 286. Further depicted in FIG. 9 is a rear face side 360 of the fourth light pipe 270 provided with a plurality of prisms 362 arrayed generally along its length, the prisms 362 oriented in a first orientation (e.g., along a height of the rear face side 360). The fourth reflector 340 includes a forward face side 366 which defines the step portion in the second part 352, the forward face side 366 facing the rear face side 360 of the fourth light pipe 270.

The plurality of prisms 332, 362 of the third and fourth light pipes 264, 270 internally reflect the light from the third light source 276 toward an exterior of the vehicle body 102. Again here, the plurality of prisms 332, 362 can be sawtooth in shape. When light is provided to the third and fourth light pipes 264, 270, the prisms 332, 362 interfere with the natural path of the light through the third and fourth light pipes 264, 270, and this interference causes the light to reflect in a first direction toward the outer lens 106. Additionally, as light travels past the plurality of prisms 332, 362, each prism functions to reflect a certain portion of the light within the respective third and fourth light pipes 264, 270 in the first direction. Therefore, as the light travels further from its light source, there is generally less and less light in each third and fourth light pipe 264, 270 with each passing prism 332, 362. As stated above, in order to equalize the amount of light reflected by each prism, prisms that are further away from the third light source 276 can be generally larger in shape (i.e., further away prisms can have a greater depth than the closer prisms). By so doing, light reflected by the larger prisms will be similar to the amount of light reflected by the smaller prisms, even though the smaller prisms are closer to the third light source 276.

Figure 5:
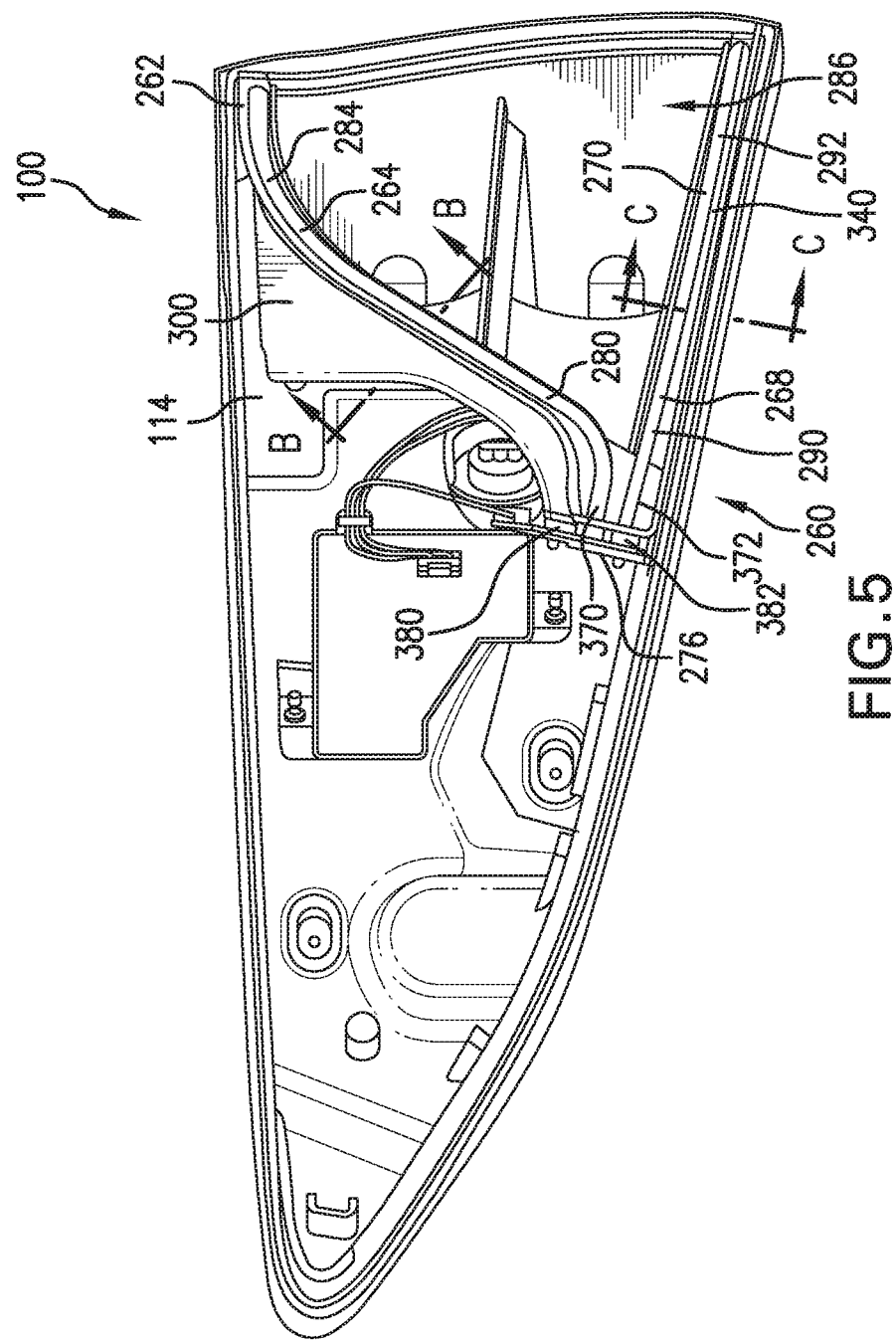
Figure 11:
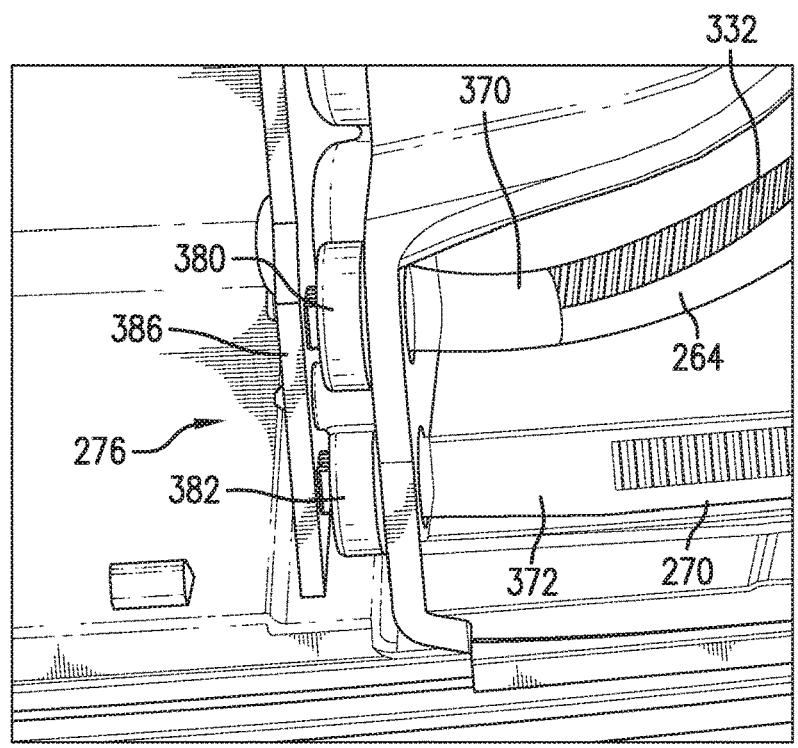
FIG. 11 is a partial perspective view of a light source for another lighting assembly for the vehicle lighting assembly.

With reference to FIGS. 5 and 11, the first section 280, 290 of each third and fourth light pipe 264, 270 includes a first end 370, 372 coupled to the third light source 276. In the depicted embodiment, the third light source 276 is a pair of third light emitting diodes (LEDs) 380, 382 which are mounted on a common operating support 386 secured in the second housing part 114, one third LED for each third and fourth light pipe 264, 270. However, the third light source 276 may be a single LED adapted to illuminate both third and fourth light pipes 264, 270, an incandescent light source(s), a fluorescent light source(s), a high intensity discharge ("HID"), or any light source suitable for providing light to the third and fourth lenses 262, 268, such that it travels along each third and fourth light pipe 264, 270. The operating support 386 can be in the form of a printed circuit board (PCB). Electrical connections are provided in or on the operating support 386 and provide electrical communication from one LED to the next. The electrical connections may take a number of different forms such as simple wiring that runs along the operating support 386, or integrated connections insulated within the operating support 386.

As is evident form the foregoing, each of the tail light section and the lid light section of the exemplary vehicle lighting assembly 100 is provided light pipes which are housed in respective reflectors and are illuminated by a pair of LEDs provided on a single operating support (e.g., printed circuit board). An inner surface of each of the light pipes include molded in optics for reflecting the light emitted from the light source toward the front of the lamp. The light pipes for the lid light section define a unitary inner lens having a thick to thin section design which allows for light to vary intensity. Further, the reflector for the lid light section can include molded in optics which face the optics of the light pipes of the lid light section.

Figure 13:
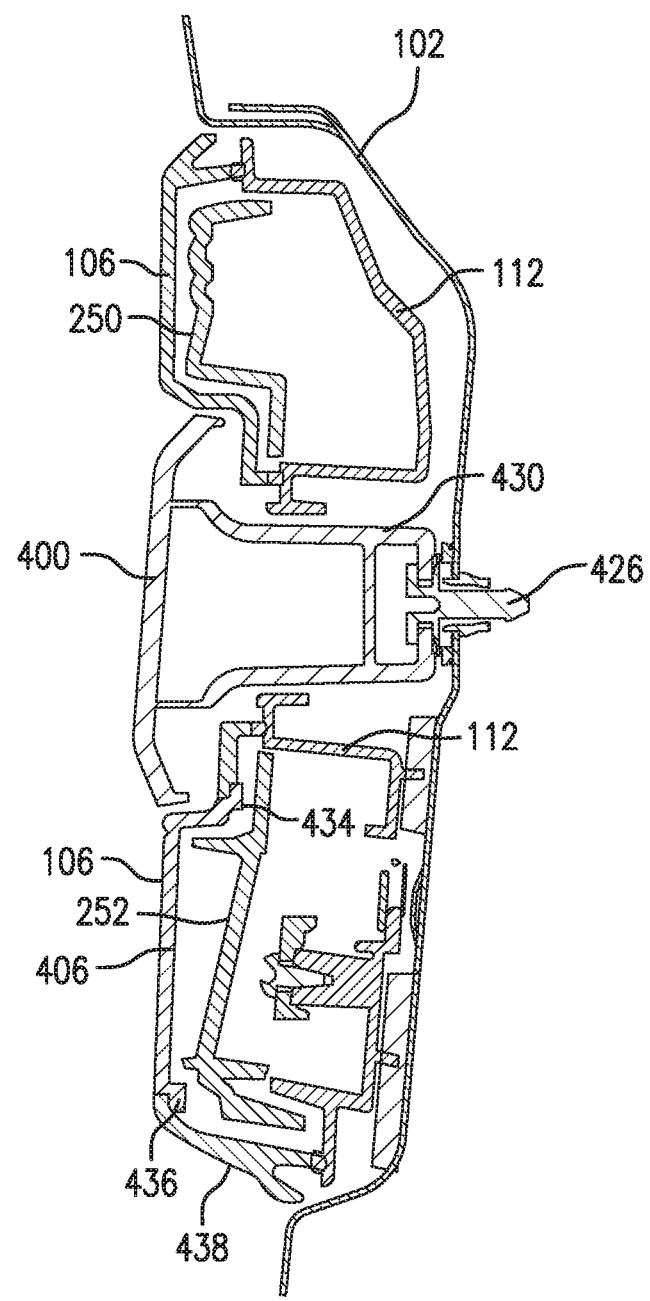
FIG. 13 is a cross-sectional view taken along line E-E of FIG. 1.
Figure 14:
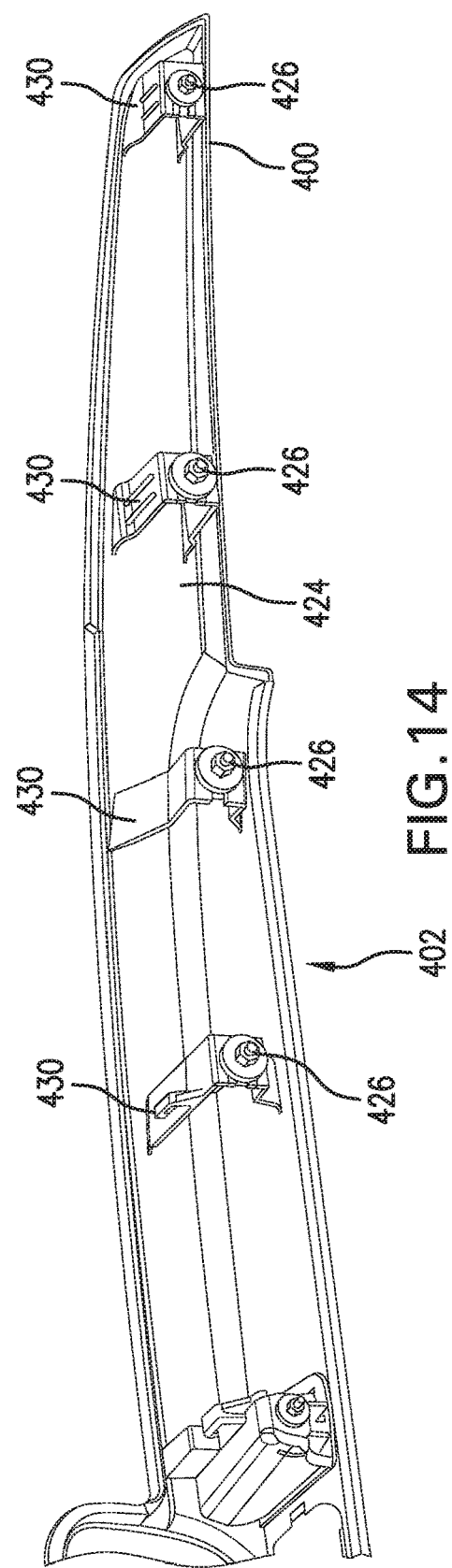
FIG. 14 is a rear perspective view of the garnish of FIG. 1.

With reference back to FIGS. 1 and 2, the first housing part 112 is configured to have mounted thereto an end portion 400 of a separate garnish 402 (e.g., a license garnish that extends laterally on the vehicle body 102) and a separate back lamp outer lens 406 that covers a back lamp reflector 410 located, for example, in a recessed portion 412 of the first housing part. As shown in FIGS. 12-14, a rear side 424 of the garnish 402 includes fasteners (e.g., the depicted clips 426), which can be attached to platforms 430 extending outwardly from the rear side 424. The fasteners extend through first and second mounting holes 418, 420 located in the recessed portion 412 above the back lamp reflector 410 and engage the vehicle body 102. Further, to mount the back lamp outer lens 406 to the first housing part 112, upper and lower mounting portions 434, 436 of the back lamp outer lens 406 are secured to the first housing part 112 via a third mounting member 438 (see FIG. 13). When mounted, the back lamp outer lens 406 and a back lamp 440 that is mounted to the vehicle body 102 are located about a center of the first light assembly 130. And with the end portion 400 of the garnish 402 mounted to the first housing part 112, one of the light pipes of the first light assembly 130 extends along an upper periphery of the garnish end portion 400 and one of the light pipes of the second light assembly 260 extends along a lower periphery of the garnish end portion 400. Therefore by having the garnish 402 mounted to the lighting assemblies 100 on each lateral side of the vehicle body 102, a continuous unit defined by the garnish 402 and the outer lenses 106 of the lighting assemblies 100 is presented. This is achieved by having each outer lens 106 configured to surround upper and lower parts of the garnish 402 with the back lamp outer lens 406 located to fill a lower gap between each outer lens 106 and the garnish 402.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle assembly comprising:
   a body;
   a light housing mounted to the body, the light housing having a first part and a second part separate from the first part;
   a first light assembly provided in the first housing part, the first light assembly including:
      a first lens having at least one first light pipe,
      a second lens separate from the first lens and having at least one second light pipe,
      a first light source for illuminating the first lens and a second light source for illuminating the second lens,
      a first reflector disposed adjacent to a rear side of the first lens, and
      a second reflector disposed adjacent to a rear side of the second lens,
      wherein each of the first and second lenses includes a locating rib and each of the first and second reflectors includes a groove adapted to receive the respective locating rib; and
   a second light assembly provided in the second housing part, the second light assembly including:

a third lens having a third light pipe,
a fourth lens separate from the third lens and having a fourth light pipe,
a third light source for illuminating the third lens and fourth lens,
a third reflector disposed adjacent to a rear side of the third lens and defining a first channel configured to receive a portion of the third lens, and
a fourth reflector disposed adjacent to a rear side of the fourth lens and defining a second channel configured to receive a portion of the fourth lens.

2. The vehicle assembly of claim 1, wherein a rear face side of each of the first and second light pipes has a plurality of prisms which internally reflect the light from the respective first and second light sources toward an exterior of the body.

3. The vehicle assembly of claim 2, wherein the first reflector has a forward face side provided with a plurality of facets which faces the rear face side of the first light pipe.

4. The vehicle assembly of claim 2, wherein the second reflector has a forward face side provided with a plurality of facets which faces the rear face side of the second light pipe.

5. The vehicle assembly of claim 1, wherein:
the first lens has a pair of spaced first light pipes and a first intermediate region connecting the pair of first light pipes, the first intermediate region is of a thinner thickness than the pair of first light pipes, and
the second lens has a pair of spaced second light pipes and a second intermediate region connecting the pair of second light pipes, the second intermediate region is of a thinner thickness than the pair of second light pipes,
wherein the first and second intermediate regions allow for light emitting though the first and second lenses to vary intensity.

6. The vehicle assembly of claim 5, wherein the first light source is a pair of first LEDs mounted on a first operating support for illuminating the pair of first light pipes and the second light source is a pair of second LEDs mounted on a second operating support for illuminating the pair of second light pipes.

7. The vehicle assembly of claim 1, wherein the first lens includes a first mounting flange secured between the first reflector and a first mounting member, and the second lens includes a second mounting flange secured between the second reflector and a second mounting member, wherein each of the first and second mounting members define secondary reflectors of the first light assembly.

8. The vehicle assembly of claim 1, wherein:
the third lens has a third light pipe and the fourth lens has a fourth light pipe, and
the third light source is a pair of third LEDs for illuminating the third light pipe and the fourth light pipe, the third LEDs being mounted on a common operating support.

9. The vehicle assembly of claim 8, wherein a rear face side of each of the third and fourth light pipes has a plurality of prisms which internally reflect the light from the third light source toward an exterior of the body.

10. The vehicle assembly of claim 9, wherein the third reflector includes an outwardly extending forward face side facing the rear face side of the third light pipe, and
the fourth reflector includes an outwardly extending forward face side facing the rear face side of the fourth light pipe.

11. The vehicle assembly of claim 1, wherein the third reflector includes first and second parts which together define the first channel, and the fourth reflector includes third and fourth parts which together define the second channel,
wherein at least one of the third reflector parts and at least one of the fourth reflector parts together define a fifth reflector for a third light assembly provided in the second housing part.

12. The vehicle assembly of claim 1, wherein the first housing part is movable relative to the second housing part.

13. A vehicle assembly comprising:
a first light housing mounted to a vehicle body, the first light housing having a first housing part and a second housing part separate from and moveable relative to the first part;
a first light assembly provided in the first housing part, the first light assembly including:
a first lens having a pair of first light pipes,
a second lens separate from the first lens and having a pair of second light pipe,
a first light source mounted on a first operating support for illuminating the first lens,
a second light source mounted on a second operating support for illuminating the second lens,
a first reflector disposed adjacent to a rear side of the first lens, and
a second reflector disposed adjacent to a rear side of the second lens;
a second light housing mounted to the vehicle body and laterally spaced from the first light housing; and
a garnish extending laterally on the vehicle body and mounted to the first and second light housings, an end portion of the garnish mounted to the first housing part, wherein one of the first light pipes of the first lens extends along part of an upper periphery of the garnish, and one of the second light pipes of the second lens extends along part of a lower periphery of the garnish,
wherein a second light assembly is provided in the second housing part, the second light assembly including:
a third lens having a third light pipe,
a fourth lens separate from the third lens and having a fourth light pipe,
a third light source for illuminating the third lens and the fourth lens, the third light source mounted on a third operating support,
a third reflector disposed adjacent to a rear side of the third lens and defining a first channel configured to receive a portion of the third lens, and
a fourth reflector disposed adjacent to a rear side of the fourth lens and defining a second channel configured to receive a portion of the fourth lens,
wherein the third light pipe extends along a periphery of the third reflector, and the fourth light pipe extends along a periphery of the fourth reflector, the third light pipe and the fourth light pipe partially framing a third light assembly provided in the second housing part, and the third reflector and fourth reflector together defining a fifth reflector for the third light assembly.

14. The vehicle assembly of claim 13 wherein a rear face side of each of the first light pipes has a plurality of prisms which internally reflect the light from the first light source toward an exterior of the vehicle body.

15. The vehicle of claim 14, wherein the first reflector has a forward face side provided with a plurality of facets which faces the rear face side of one of the first light pipes.

16. The vehicle of claim 13, wherein:
the first lens has a first intermediate region connecting the pair of first light pipes, the first intermediate region is of a thinner thickness than the pair of first light pipes, and
the second lens has a second intermediate region connecting the pair of second light pipes, the second intermediate region is of a thinner thickness than the pair of second light pipes,
wherein the first and second intermediate regions allow for light emitting though the first and second lenses to vary intensity.

17. The vehicle assembly of claim 13, wherein a rear face side of each of the third and fourth light pipes has a plurality of prisms which internally reflect the light from the third light source toward an exterior of the body,
wherein the third reflector includes a first step portion having a forward face side which faces the rear face side of the third light pipe, and one of the fourth reflectors includes a second step portion having a forward face side which faces the rear face side of the fourth light pipe.

18. A vehicle assembly comprising:
a body;
a light housing mounted to the body, the light housing having a first part and a second part separate from the first part;
a first light assembly provided in the first housing part, the first light assembly including:
a first lens having at least one first light pipe,
a second lens separate from the first lens and having at least one second light pipe,
a first light source for illuminating the first lens and a second light source for illuminating the second lens,
a first reflector disposed adjacent to a rear side of the first lens, and
a second reflector disposed adjacent to a rear side of the second lens; and
a second light assembly provided in the second housing part, the second light assembly including:
a third lens having a third light pipe,
a fourth lens separate from the third lens and having a fourth light pipe,
a third light source for illuminating the third lens and fourth lens,
a third reflector disposed adjacent to a rear side of the third lens and defining a first channel configured to receive a portion of the third lens, and
a fourth reflector disposed adjacent to a rear side of the fourth lens and defining a second channel configured to receive a portion of the fourth lens,
wherein the third reflector and the fourth reflector together define a fifth reflector for a third light assembly provided in the second housing part.

* * * * *